(12) United States Patent
Park et al.

(10) Patent No.: US 9,627,134 B2
(45) Date of Patent: Apr. 18, 2017

(54) CERAMIC DIELECTRIC COMPOSITION AND MULTILAYER CERAMIC CAPACITOR CONTAINING THE SAME

(71) Applicant: SAMSUNG ELECTRO-MECHANICS CO., LTD., Suwon-Si, Gyeonggi-Do (KR)

(72) Inventors: Jae Sung Park, Suwon-Si (KR); Seok Hyun Yoon, Suwon-Si (KR); Chang Hoon Kim, Suwon-Si (KR); Doo Young Kim, Suwon-Si (KR); Soo Kyong Jo, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/936,409

(22) Filed: Nov. 9, 2015

(65) Prior Publication Data
US 2016/0163458 A1 Jun. 9, 2016

(30) Foreign Application Priority Data

Dec. 8, 2014 (KR) ........................ 10-2014-0175018

(51) Int. Cl.
| | | |
|---|---|---|
| C04B 35/465 | (2006.01) | |
| C04B 35/47 | (2006.01) | |
| H01G 4/12 | (2006.01) | |
| B32B 18/00 | (2006.01) | |
| C04B 35/49 | (2006.01) | |
| C04B 35/626 | (2006.01) | |
| H01G 4/30 | (2006.01) | |

(52) U.S. Cl.
CPC ........... *H01G 4/1245* (2013.01); *B32B 18/00* (2013.01); *C04B 35/465* (2013.01); *C04B 35/47* (2013.01); *C04B 35/49* (2013.01); *C04B 35/6261* (2013.01); *C04B 35/62675* (2013.01); *H01G 4/1227* (2013.01); *H01G 4/1236* (2013.01); *C04B 2235/3206* (2013.01); *C04B 2235/3208* (2013.01); *C04B 2235/3215* (2013.01); *C04B 2235/3217* (2013.01); *C04B 2235/3227* (2013.01); *C04B 2235/3229* (2013.01); *C04B 2235/3251* (2013.01); *C04B 2235/3294* (2013.01); *C04B 2235/3418* (2013.01); *C04B 2235/442* (2013.01); *C04B 2235/6025* (2013.01); *C04B 2235/6582* (2013.01); *C04B 2237/346* (2013.01); *C04B 2237/348* (2013.01); *C04B 2237/704* (2013.01); *H01G 4/30* (2013.01)

(58) Field of Classification Search
CPC .............................. C04B 35/465; C04B 35/47
See application file for complete search history.

(56) References Cited

U.S. PATENT DOCUMENTS

| | | | | |
|---|---|---|---|---|
| 4,405,472 | A * | 9/1983 | Murase | H01G 4/1281 252/521.4 |
| 4,889,837 | A * | 12/1989 | Ono | H01G 4/1281 252/520.21 |
| 6,617,273 | B2 * | 9/2003 | Motoki | C04B 35/465 501/136 |
| 6,730,624 | B2 * | 5/2004 | Motoki | C04B 35/465 264/615 |
| 7,498,285 | B2 * | 3/2009 | Ito | B32B 18/00 501/136 |
| 8,178,456 | B2 * | 5/2012 | Burn | C04B 35/465 361/321.4 |
| 2004/0220043 | A1* | 11/2004 | Fukui | C01G 23/006 501/136 |
| 2005/0095851 | A1* | 5/2005 | Watanabe | C04B 35/465 438/663 |
| 2007/0273468 | A1* | 11/2007 | Kang | C04B 35/47 338/20 |
| 2008/0193776 | A1* | 8/2008 | Ito | B32B 18/00 428/433 |
| 2010/0008019 | A1* | 1/2010 | Burn | C04B 35/465 361/321.4 |
| 2013/0234293 | A1* | 9/2013 | Kawamoto | B82Y 30/00 257/602 |

FOREIGN PATENT DOCUMENTS

| | | | |
|---|---|---|---|
| JP | 52010596 | * | 1/1997 |
| JP | 2002141241 | * | 5/2002 |
| JP | 2004292173 | * | 10/2004 |
| JP | 2012-156386 A | | 8/2012 |
| JP | 2013-243281 A | | 12/2013 |
| KR | 10-0259327 B1 | | 3/2000 |

* cited by examiner

*Primary Examiner* — Karl Group
(74) *Attorney, Agent, or Firm* — McDermott Will & Emery LLP

(57) ABSTRACT

A ceramic dielectric composition contains a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, in which x and y satisfy $0 \leq x \leq 1.0$ and $0.2 \leq y \leq 0.9$, respectively. The ceramic dielectric composition may have high room-temperature permittivity and excellent ESD protection characteristics and may secure withstand voltage characteristics while implementing relatively high capacitance.

4 Claims, 2 Drawing Sheets

A-A'

US 9,627,134 B2

CERAMIC DIELECTRIC COMPOSITION AND MULTILAYER CERAMIC CAPACITOR CONTAINING THE SAME

CROSS-REFERENCE TO RELATED APPLICATION

This application claims the benefit of priority to Korean Patent Application No. 10-2014-0175018 filed on Dec. 8, 2014, with the Korean Intellectual Property Office, the disclosure of which is incorporated herein by reference.

BACKGROUND

The present disclosure relates to a ceramic dielectric composition able to be used in automotive electronics and having excellent mechanical strength and electrostatic discharge (ESD) protection characteristics, and a multilayer ceramic capacitor containing the same.

In general, electronic components using a ceramic material, such as capacitors, inductors, piezoelectric elements, varistors, or thermistors, or the like, include a ceramic body formed of a ceramic material, internal electrodes formed in the ceramic body, and external electrodes mounted on surfaces of the ceramic body to be connected to the internal electrodes.

Among ceramic electronic components, multilayer ceramic capacitors commonly include a plurality of stacked dielectric layers, internal electrodes disposed to face each other with respective dielectric layers interposed therebetween, and external electrodes electrically connected to the internal electrodes.

Multilayer ceramic capacitors have been widely used as components of mobile communications devices such as tablet computers, personal digital assistants (PDA), mobile phones, and the like, due to inherent advantages thereof, such as a small size, high capacitance, ease in the mounting thereof, and the like.

Particularly, multilayer ceramic capacitors for automotive applications should have excellent mechanical strength and excellent electrostatic discharge (ESD) protection characteristics.

Generally, a dielectric material satisfying X7R characteristics as a ferroelectric material, or a C0G-based (C-zero-G) paraelectric material, have been used as a ceramic dielectric composition applied to a multilayer ceramic capacitor having electrostatic discharge (ESD) protection characteristics.

A ferroelectric material has a high degree of permittivity, and thus provides an advantage in that a dielectric layer may be designed to be relatively thick. However, when evaluating electrostatic discharge (ESD) protection characteristics, electrostrictive cracks may occur under a high electric field environment or capacitance may be decreased due to DC-bias characteristics, such that a higher voltage may be actually applied to the capacitor, thereby deteriorating the ESD protection characteristics.

The C0G-based paraelectric material has a low permittivity, such that a dielectric layer should be relatively thin, and thus, withstand voltage characteristics may be deteriorated, such that ESD protection characteristics may not be satisfied.

Therefore, research into a dielectric material having relatively high permittivity due to permittivity that remains unchanged regardless of a direct current (DC) electric field, while having excellent DC-bias characteristics, as a dielectric composition of an automotive electrostatic discharge (ESD) protection capacitor, has been required.

SUMMARY

An aspect of the present disclosure may provide a ceramic dielectric composition able to be used in automotive electronics, having excellent mechanical strength as well as electrostatic discharge (ESD) protection characteristics, and a multilayer ceramic capacitor containing the same.

According to an aspect of the present disclosure, a ceramic dielectric composition may contain a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, in which x and y satisfy $0 \leq x \leq 1.0$ and $0.2 \leq y \leq 0.9$, respectively.

X and y may have different values.

According to another aspect of the present disclosure, a multilayer ceramic capacitor may include a ceramic body in which dielectric layers and first and second internal electrodes are alternately stacked. First and second external electrodes are formed on opposing end portions of the ceramic body and electrically connected to the first and second internal electrodes. The dielectric layers may contain a ceramic dielectric composition containing a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, in which x and y satisfy $0 \leq x \leq 1.0$ and $0.2 \leq y \leq 0.9$, respectively.

According to another aspect of the present disclosure, a multilayer ceramic capacitor may include a ceramic body in which dielectric layers and first and second internal electrodes are alternately stacked. First and second external electrodes are formed on opposing end portions of the ceramic body and electrically connected to the first and second internal electrodes. The dielectric layers may contain a ceramic dielectric composition having room-temperature permittivity of 50 or more and satisfying a dielectric constant ($\in_r$) change rate of 10% or less when a DC electric field is changed from 0 V/μm to 5 V/μm.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
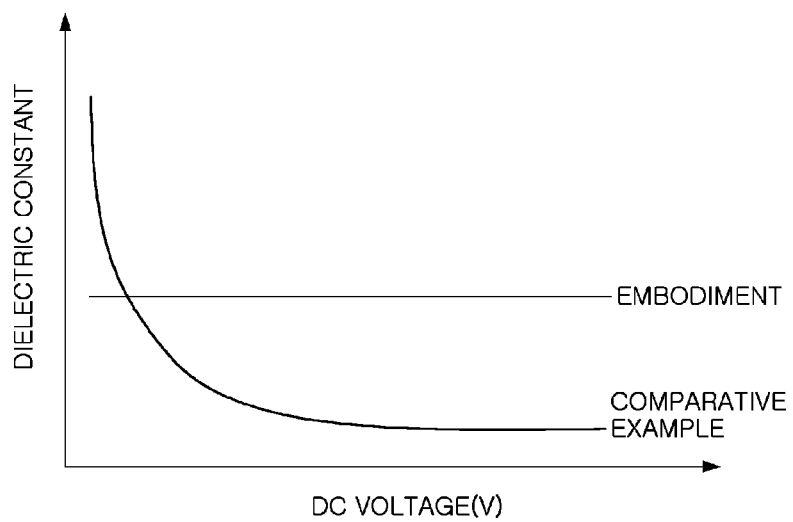
FIG. 1 is a graph illustrating a change in dielectric constant versus direct current voltage (V) according to the embodiments of the present disclosure and the comparative examples.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a ceramic dielectric composition. Examples of electronic components containing the ceramic dielectric composition may include capacitors, inductors, piezoelectric elements, varistors, thermistors, and the like. Hereinafter, the ceramic dielectric composition and a multilayer ceramic capacitor, as an example of an electronic component, will be described.

The ceramic dielectric composition according to an exemplary embodiment in the present disclosure may contain a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, where x and y satisfy $0 \leq x \leq 1.0$ and $0.2 \leq y \leq 0.9$, respectively.

The ceramic dielectric composition according to the exemplary embodiment in the present disclosure may have permittivity of 50 or more. In certain embodiments, the composition has a permittivity of 100 or more at room temperature.

Further, a multilayer ceramic capacitor using the ceramic dielectric composition according to the exemplary embodiment in the present disclosure may have excellent DC-bias characteristics. For instance, when applying a direct current (DC) electric field, there is no change in permittivity, and thus capacitance is not decreased, such that withstand voltage characteristics may not deteriorate, and ESD protection characteristics may also be excellent.

Hereinafter, respective ingredients of the ceramic dielectric composition according to the exemplary embodiment in the present disclosure will be described in detail.

a) Base Material Powder

The ceramic dielectric composition according to the exemplary embodiment in the present disclosure may contain a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, where x and y satisfy $0 \leq x \leq 1.0$ and $0.2 \leq y \leq 0.9$, respectively.

Generally, as a ceramic dielectric composition applied to a multilayer ceramic capacitor having electrostatic discharge (ESD) protection characteristics, a dielectric material satisfying X7R characteristics as a ferroelectric material, or a C0G (-based paraelectric material has been used.

For example, in the case of applications of the ceramic dielectric composition to automotive electronics, a multilayer ceramic capacitor is required to have excellent mechanical strength and excellent electrostatic discharge (ESD) protection characteristics.

A ferroelectric material has a high permittivity, such that a dielectric layer may be designed to be relatively thick. But when evaluating electrostatic discharge (ESD) protection characteristics, electrostrictive cracks may occur under a high electric field environment, or actual capacitance may be decreased due to DC-bias characteristics, such that a higher voltage may be actually applied to the capacitor, thereby deteriorating ESD characteristics.

Further, in the case of using the C0G-based paraelectric material, permittivity is relatively low, such that a dielectric layer should have a reduced thickness in order to secure capacitance of the capacitor, and withstand voltage characteristics may be deteriorated thereby, and ESD protection characteristics may not be satisfied.

According to the exemplary embodiment in the present disclosure, the ceramic dielectric composition may contain the base material powder in which a paraelectric material having excellent DC-bias characteristics is used, but of which room-temperature permittivity is increased by about 4 or more times as compared to a general paraelectric material.

For instance, excellent ESD protection characteristics may be secured, high capacitance may be obtained, and withstand voltage characteristics may be improved at the same time, by using the paraelectric material having excellent DC-bias characteristics while increasing room-temperature permittivity thereof.

In detail, the base material powder may be represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$. This material may be the paraelectric material having excellent DC-bias characteristics.

Further, in order to increase room-temperature permittivity of the paraelectric material, among solid solution elements of the material, a ratio of Zr/Ti may be adjusted.

For instance, permittivity of the paraelectric material according to the exemplary embodiment in the present disclosure may be increased by 4 or more times as compared to the general paraelectric material by adjusting y to obtain the ratio of Zr/Ti to satisfy $0.2 \leq y \leq 0.9$.

In a case in which y is less than 0.2, the permittivity thereof may be relatively low, such that when forming a dielectric layer to have a small thickness in order to obtain required capacitance, withstand voltage characteristics may be deteriorated.

In a case in which y is more than 0.9, X7R (−55° C.~125° C.) temperature characteristics may not be implemented.

For example, according to the exemplary embodiment in the present disclosure, room-temperature insulation resistance may be excellent by adjusting y to obtain the ratio of Zr/Ti to satisfy $0.2 \leq y \leq 0.9$.

However, where x and y are the same as each other, room-temperature insulation resistance may be decreased. Consequently, x and y according to the exemplary embodiment in the present disclosure may have different values.

For instance, the base material powder of the ceramic dielectric composition according to the exemplary embodiment in the present disclosure may have high room-temperature permittivity and excellent DC-bias characteristics by adjusting a composition ratio of respective ingredients in the paraelectric material having excellent DC-bias characteristics to be within a predetermined range.

Since the base material powder has room-temperature permittivity higher than that of a paraelectric material according to the related art, a dielectric layer may be designed to be thicker, and since excellent DC-bias characteristics may be exhibited therein, the ESD protection characteristics thereof may also be excellent.

The base material powder is not particularly limited, but may have an average particle size of 1000 nm or less.

b) First Accessory Ingredient

According to the exemplary embodiment in the present disclosure, the ceramic dielectric composition may further contain an oxide or carbonate containing at least one or more of manganese (Mn), vanadium (V), chromium (Cr), Iron (Fe), nickel (Ni), cobalt (Co), copper (Cu), and zinc (Zn) as a first accessory ingredient.

The oxide or carbonate containing at least one or more of Mn, V, Cr, Fe, Ni, Co, Cu, and Zn, as the first accessory ingredient, may be contained in an amount of 0.1 to 1.0 atomic percentage (at %), based on 100 at % of the base material powder.

The first accessory ingredient may serve to decrease a sintering temperature of a multilayer ceramic capacitor using the ceramic dielectric composition and improve the high-temperature withstand voltage characteristics.

The content of the first accessory ingredient and a content of a second accessory ingredient to be described below, based on 100 at % of the base material powder, may be defined by atomic percentage (at %) of metal ions contained in the respective accessory ingredients.

When the content of the first accessory ingredient is less than 0.1 at %, reduction resistance and reliability may be deteriorated.

When the content of the first accessory ingredient is more than 1.0 at %, side effects such as an increase in the sintering temperature, a decrease in capacitance, an increase in an aging rate, and the like, may occur.

For instance, the ceramic dielectric composition according to the exemplary embodiment in the present disclosure may further contain 0.1 to 1.0 at % of the first accessory ingredient, based on 100 at % of base material powder, such that the ceramic dielectric composition may be sintered at a relatively low temperature and obtain excellent high-temperature withstand voltage characteristics.

c) Second Accessory Ingredient

According to the exemplary embodiment in the present disclosure, the ceramic dielectric composition may contain at least one of magnesium (Mg) and aluminum (Al) as a second accessory ingredient.

The ceramic dielectric composition may contain 0.1 to 1.0 at % of the second accessory ingredient, an oxide or carbonate containing at least one of Mg and Al, based on 100 at % of the base material powder.

The oxide or carbonate containing at least one of Mg and Al may be contained in the ceramic dielectric composition as the second accessory ingredient in an amount of 0.1 to 1.0 at %, based on 100 at % of the base material powder.

The second accessory ingredient may serve to decrease the sintering temperature of the multilayer ceramic capacitor using the ceramic dielectric composition and improve the high-temperature withstand voltage characteristics thereof.

When the content of the second accessory ingredient is less than 0.1 at %, reduction resistance and reliability may be deteriorated.

When the content of the second accessory ingredient is more than 1.0 at %, side effects such as an increase in the sintering temperature, a decrease in capacitance, an increase in an aging rate, and the like, may occur.

For instance, the ceramic dielectric composition according to the exemplary embodiment in the present disclosure may further contain 0.1 to 1.0 at % of the second accessory ingredient, based on 100 at % of base material powder, such that the ceramic dielectric composition may be sintered at a relatively low temperature and obtain excellent high-temperature withstand voltage characteristics.

d) Third and Fourth Accessory Ingredients

According to the exemplary embodiment in the present disclosure, the ceramic dielectric composition may contain an oxide or carbonate containing at least one of cerium (Ce), niobium (Nb), lanthanum (La), and antimony (Sb) as a third accessory ingredient, and may further contain an oxide or carbonate containing at least one of silicon (Si), barium (Ba), calcium (Ca), and aluminum (Al), or a glass compound containing Si as a fourth accessory ingredient.

The third accessory ingredient, the oxide or carbonate containing at least one of cerium (Ce), niobium (Nb), lanthanum (La), and antimony (Sb), may be added to the ceramic dielectric composition, such that reduction resistance and reliability may be improved.

The fourth accessory ingredient, the oxide or carbonate containing at least one of Si, barium (Ba), Ca, and Al, or the glass compound containing Si, may be added to the ceramic dielectric composition, such that the sintering temperature may be decreased, and the sintering may be promoted.

FIG. 1 is a graph illustrating a change in dielectric constant versus direct current voltage (V) according to an embodiment of the present disclosure and comparative example.

Referring to FIG. 1, it may be appreciated that in a multilayer ceramic capacitor using a ceramic dielectric composition of an embodiment of the present disclosure, when applying a DC voltage, while the DC voltage was increased from 0 V to 10 V, permittivity was not changed.

Further, it may be appreciated that in a multilayer ceramic capacitor using a commercialized X5R dielectric material of comparative example, a ferroelectric material, when applying the DC voltage, as the DC voltage was increased from 0 V to 10 V, permittivity was rapidly decreased.

Accordingly, the multilayer ceramic capacitor using the ceramic dielectric composition according to the exemplary embodiment in the present disclosure may have excellent DC-bias characteristics. For instance, when applying the direct current (DC) electric field thereto, there is no change in permittivity, and thus capacitance is not decreased, such that high capacitance characteristics of the multilayer ceramic capacitor may be implemented.

Further, since DC-bias characteristics may be excellent, room-temperature permittivity may be higher than that of a paraelectric material according to the related art, such that a dielectric layer may be designed to have a relatively large thickness, and thus, the ESD protection characteristics may be excellent.

Figure 2:
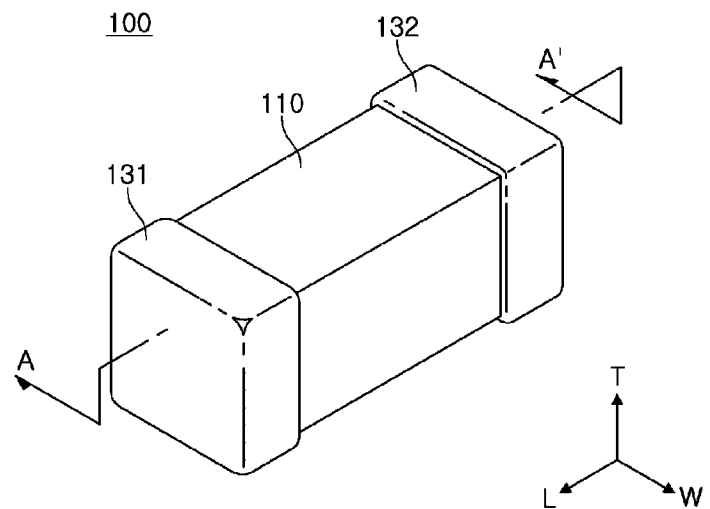
FIG. 2 is a schematic perspective view of a multilayer ceramic capacitor according to an exemplary embodiment in the present disclosure.
Figure 3:
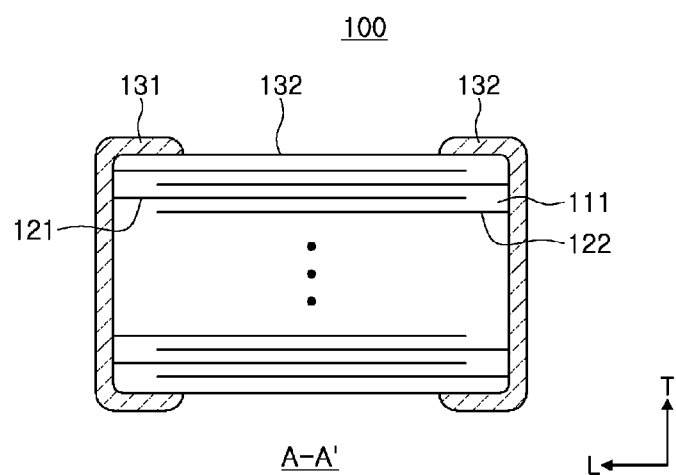
FIG. 3 is a schematic cross-sectional view of the multilayer ceramic capacitor, taken along line A-A' of FIG. 2.

FIG. 2 is a schematic perspective view of a multilayer ceramic capacitor 100 according to an exemplary embodiment in the present disclosure, and FIG. 3 is a schematic cross-sectional view of the multilayer ceramic capacitor 100, taken along line A-A' of FIG. 2.

Referring to FIGS. 2 and 3, the multilayer ceramic capacitor 100 according to another exemplary embodiment in the present disclosure may include a ceramic body 110 in which dielectric layers 111 and first and second internal electrodes 121 and 122 are alternately stacked. First and second external electrodes 131 and 132 electrically connected to the first and second internal electrodes 121 and 122 disposed alternately with dielectric layers 111 in the ceramic body 110, respectively, may be formed on opposing end portions of the ceramic body 110.

A shape of the ceramic body 110 is not particularly limited, but may be a rectangular parallelepiped shape. In addition, a dimension of the ceramic body 110 is not particularly limited, and the ceramic body may have a suitable dimension depending on the use thereof. For example, the ceramic body may have a dimension of (0.6~5.6 mm)×(0.3~5.0 mm)×(0.3~1.9 mm).

A thickness of the dielectric layer 111 may be optionally changed according to capacitance design of the capacitor. According to the exemplary embodiment in the present disclosure, a thickness of a single dielectric layer after sintering may be, for example, 0.2 µm or more.

In a case in which the dielectric layer has an excessively small thickness, the number of grains existing in the single dielectric layer is relatively small, which has a negative influence on reliability. Accordingly, the thickness of the dielectric layer may be 0.2 μm or more.

The first and second internal electrodes 121 and 122 may be stacked such that end surfaces thereof are alternately exposed to opposing end surfaces of the ceramic body 110, respectively.

The first and second external electrodes 131 and 132 may be formed on opposing end portions of the ceramic body 110 and may be electrically connected to the exposed end surfaces of the alternately disposed first and second internal electrodes 121 and 122, respectively, thereby configuring a capacitor circuit.

A conductive material contained in the first and second internal electrodes 121 and 122 is not particularly limited. However, since a material of the dielectric layer according to the exemplary embodiment in the present disclosure may have a form in which a paraelectric material and a ferroelectric material are mixed with each other or solid-dissolved, a noble metal may be used.

The noble metal used as the conductive material may be palladium (Pd) or a palladium (Pd) alloy.

For example, the palladium (Pd) alloy may be an alloy of palladium (Pd) and at least one selected from manganese (Mn), chromium (Cr), cobalt (Co), and aluminum (Al). A content of palladium (Pd) in the alloy may be 95 wt % or more.

The noble metal used as the conductive material may also be silver (Ag) or a silver (Ag) alloy.

A thickness of the first and second internal electrodes 121 and 122 may be appropriately determined depending on the use, or the like, but is not particularly limited. For example, the thickness of the first or second internal electrode 121 or 122 may be 0.1 to 5 μm, or 0.1 to 2.5 μm.

A conductive material contained in the first and second external electrodes 131 and 132 is not particularly limited, but nickel (Ni), copper (Cu), or an alloy thereof may be used.

A thickness of the first and second external electrodes 131 and 132 may be appropriately determined depending on the use, or the like, but is not particularly limited. For example, the thickness of each of the first and second external electrodes 131 and 132 may be 10 to 50 μm.

The dielectric layers 111 of the ceramic body 110 may contain the ceramic dielectric composition according to the exemplary embodiment in the present disclosure.

The ceramic dielectric composition according to the exemplary embodiment in the present disclosure may contain a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, where x and y satisfy $0 \leq x \leq 1.0$ and $0.2 \leq y \leq 0.9$, respectively.

Because characteristics of this ceramic dielectric composition according to another exemplary embodiment in the present disclosure are the same as those of the ceramic dielectric composition according to the exemplary embodiment in the present disclosure described above, a detailed description thereof will be omitted.

A multilayer ceramic capacitor 100 according to another exemplary embodiment in the present disclosure may include a ceramic body 110 in which dielectric layers 111 and first and second internal electrodes 121 and 122 are alternately stacked. First and second external electrodes 131 and 132 may be formed on opposing end portions of the ceramic body 110 and electrically connected to the first and second internal electrodes 121 and 122. The dielectric layers 111 may contain a ceramic dielectric composition having room-temperature permittivity of 50 or more and satisfying a dielectric constant ($\in_r$) change rate of 10% or less when a DC electric field is changed from 0 V/μm to 5 V/μm.

According to another exemplary embodiment in the present disclosure, the dielectric layer 111 may contain the ceramic dielectric composition having room-temperature permittivity of 50 or more and satisfying a dielectric constant ($\in_r$) change rate of 10% or less when the DC electric field is changed from 0 V/μm to 5 V/μm, such that when applying a direct current (DC) electric field, since there is no change in permittivity, capacitance may not be decreased, whereby high capacitance characteristics may be implemented.

Further, since the ceramic dielectric composition may have excellent DC-bias characteristics, for instance, when applying a direct current (DC) electric field, there is no change in permittivity, and thus capacitance is not decreased; excellent ESD protection characteristics, or the like, may be implemented.

The ceramic dielectric composition may contain a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, where x and y satisfy $0 \leq x \leq 1.0$ and $0.2 \leq y \leq 0.9$, respectively.

Since other features of the ceramic dielectric composition are the same as those of the dielectric ceramic capacitor and the multilayer ceramic capacitors according to the exemplary embodiments in the present disclosure, a description thereof will be omitted.

Hereinafter, the present disclosure will be described in more detail through embodiments of the present disclosure and comparative example, but they are to help the specific understanding of the present disclosure. Accordingly, the scope of the present disclosure is not limited to the embodiments.

An existing C0G-based paraelectric material, $(Ca,Sr)(Zr,Ti)O_3$ was used as a base material main ingredient. In addition, in order to implement relatively high permittivity, a ratio of Zr/Ti, solid-solution elements at B-site, was adjusted as illustrated in the following Table 1.

In this case, in order to suppress reduction of a sintered body due to an increase in a content of Ti, 3 wt % of a Mn—Zr—Si compound, a reduction resistant additive, was added as an accessory ingredient.

When preparing slurry, zirconia balls were used as mixing/dispersing media, and the base material main ingredient and accessory ingredient powder were mixed with ethanol/toluene, a dispersant, and a binder and then ball-milled for 15 hours.

The prepared slurry mixture was subjected to calcination at a temperature of 1250° C. under air atmosphere in order to synthesize $(Ca,Sr)(Zr,Ti)O_3$ phases, and in order to enable the calcined powder of which a necking phenomenon occurred during the calcination to become primary particles again. Wet-milling was additionally performed.

Thereafter, K2 bulk specimens for confirming basic characteristics of materials were manufactured, and working samples for confirming whether or not ESD characteristics were actually improved were manufactured and evaluated. The experimental methods and results were as follows.

Manufacturing of K2 Bulk Specimens

Sheets having a thickness of 10 to 15 μm were manufactured using the prepared slurry and a coater in a small doctor blade scheme in order to manufacture a K2 bulk specimen, were stacked so that a green specimen had a thickness of about 0.8 mm after compressing the stacked sheets, and were followed by cutting, thereby forming a K2 bulk specimen having a size of 1.0 cm×1.0 cm (width×length).

After the manufactured K2 bulk specimen was calcined at 400° C. under air atmosphere and sintered at 1,230° C. under 0.5% $H_2$ atmosphere, electrical characteristics, insulation resistance, temperature coefficient of capacitance (TCC), and the like, thereof were measured.

Room-temperature capacitance and dielectric loss of a capacitor to which the bulk K2 specimen was applied were measured using a LCR-meter at 1 kHz and AC 1 V, and room-temperature insulation resistance was measured after 60 seconds in a state in which respective ten samples were taken and a DC voltage was applied thereto.

Temperature coefficient of capacitance (TCC) was measured in a temperature range of −55 to 125° C. under the conditions of 1 kHz and AC 1 V.

TABLE 1

| Sample | Moles of Each Ingredient in Base Material | | | |
|---|---|---|---|---|
| | A-site | | B-site | |
| | Ca | Sr | Zr | Ti |
| *1 | 0.60 | 0.40 | 0.90 | 0.10 |
| 2 | 0.60 | 0.40 | 0.80 | 0.20 |
| 3 | 0.60 | 0.40 | 0.70 | 0.30 |
| 4 | 0.60 | 0.40 | 0.60 | 0.40 |
| 5 | 0.60 | 0.40 | 0.50 | 0.50 |
| 6 | 0.50 | 0.50 | 0.60 | 0.40 |
| 7 | 0.60 | 0.40 | 0.40 | 0.60 |
| 8 | 0.60 | 0.40 | 0.30 | 0.70 |
| 9 | 0.60 | 0.40 | 0.20 | 0.80 |
| 10 | 0.60 | 0.40 | 0.10 | 0.90 |

*comparative example

TABLE 2

| Sample | Dielectric Constant | Log I.R (Ω × cm) | TCC (@125° C.) |
|---|---|---|---|
| *1 | 35 | 15.10 | −0.003% |
| 2 | 54 | 14.28 | −0.7% |
| 3 | 75 | 13.98 | −1.4% |
| 4 | 89 | 10.95 | −2.8% |
| 5 | 110 | 13.52 | −5.6% |
| 6 | 94 | 14.55 | −3.9% |
| 7 | 131 | 14.41 | −6.8% |
| 8 | 159 | 14.16 | −8.2% |
| 9 | 187 | 13.84 | −10.3% |
| 10 | 211 | 13.65 | −14.6% |

*comparative example

Referring to Table 2, it may be appreciated that in the case of sample 1 (Comparative Example) in which a content y of Ti was 0.1, the content y was out of the numerical range of the present disclosure, such that a dielectric constant value was relatively low.

It may be appreciated that in cases of samples 11 to 15 (comparative examples) in which a molar ratio of a first main ingredient of the base material powder was less than 0.50, room-temperature permittivity was low and dissipation factor (DF) was relatively high.

In addition, it may be appreciated that in cases of samples 2 to 10 (embodiments of the present disclosure) in which the number of moles of the main ingredient of the base material powder satisfied the numerical range of the present disclosure, the room-temperature dielectric constant was at least 4 times higher than that of a paraelectric material according to the related art, and insulation resistance and TCC characteristics were also excellent.

Meanwhile, it may be appreciated that in the case of sample 4, the dielectric constant, TCC characteristics, and ESD protection characteristics were satisfied as described below, but insulation resistance was relatively low.

Accordingly, in the base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$ in Embodiments of the present disclosure, x and y may have different values.

Manufacturing of Working Sample and Confirmation of ESD Characteristics

Capacitors for ESD protection having a 1608-standard size and capacitance of 4.7 nF were manufactured using the ceramic dielectric compositions of samples 7 and 10 selected by confirming dielectric characteristics of the 10 bulk specimens depending on the composition of the base material.

When preparing slurry, the base material powder and accessory ingredient powder were mixed with each other using 0.8 mm zirconia balls as mixing/dispersing media, and sheets having a thickness of 15 μm were manufactured using the slurry prepared as described above and an off-roll type coater.

A Ni internal electrode was printed on the sheet, and 70 active sheets on which the Ni internal electrode was printed were stacked while being compressed, thereby manufacturing a bar.

The compressed bar was cut into electronic components having a 1608-standard size (1.6 mm×0.8 mm) using a cutter.

After the manufactured electronic component having the 1608 standard size was calcined and sintered at 1190 to 1,230° C. for 1 hour (0.1% of $H_2$/99.9% of $N_2$, $H_2O/H_2/N_2$ atmosphere), the sintered electronic component was terminated, thereby completing a capacitor for ESD protection. Then, electrical characteristics of the completed capacitor were measured.

Basic electrical characteristics were measured by the same method as in the measurement method of the K2 bulk specimen, and in order to measure ESD protection characteristics, a significantly high voltage of 20, 22, or 25 kV was applied thereto in a state in which a discharge gun discharging an ESD voltage and the respective specimens were connected to each other and to the ground, and IR was measured, such that whether or not the capacitor passed the test was judged.

Evaluation results of Embodiments of the present disclosure and Comparative Examples were summarized in the following Table 3.

TABLE 3

| Classification | Comparative example | | Embodiment | |
|---|---|---|---|---|
| Evaluation Category | Ferroelectric Material | Paraelectric Material | Sample 7 of Table 1 | Sample 10 of Table 1 |
| Thickness of Dielectric Layer (μm) | 70 | 5 | 15 | 15 |
| Capacitance | Good | Good | Good | Good |
| DF | Good | Good | Good | Good |
| DC-bias | Poor | Excellent | Excellent | Good |
| TCC (@125° C.) | Fair | Good | Good | Good |
| ESD Evaluation 20 kV | Good | Good | Good | Good |
| 22 kV | Poor | Poor | Good | Good |
| 25 kV | Poor | Poor | Good | Good |

In the case of the comparative example in which the X7R ferroelectric material, an existing dielectric composition, was used, even in a case in which the thickness of the dielectric layer was 70 μm or so, for instance, the dielectric layer was designed to have a relatively thick thickness, effective capacitance was rapidly decreased under a high electric field environment of the ESD test. Accordingly, in this case, it was difficult to satisfy the ESD protection characteristics under a test condition of 22 kV or more.

Further, in a case of using an existing paraelectric material having relatively low permittivity, DC-bias characteristics were excellent, but permittivity was significantly low, such that the dielectric layers should be thinned in order to satisfy capacitance of the capacitor, and thus, withstanding voltage characteristics were deteriorated. Accordingly, in this case, the capacitor did not pass evaluation standards of the ESD test.

As set forth above, according to exemplary embodiment in the present disclosure, the ceramic dielectric composition may have relatively high room-temperature permittivity and excellent ESD protection characteristics and secure withstand voltage characteristics while implementing relatively high capacitance.

Further, since the multilayer ceramic capacitor using the ceramic dielectric composition according to exemplary embodiments in the present disclosure may have excellent DC-bias characteristics, for instance, when applying a direct current (DC) electric field, there is no change in permittivity, and thus, capacitance is not decreased; high capacitance characteristics, excellent ESD protection characteristics, and the like, may be implemented.

While exemplary embodiments have been shown and described above, it will be apparent to those skilled in the art that modifications and variations could be made without departing from the scope of the present invention as defined by the appended claims.

What is claimed is:

1. A ceramic dielectric composition comprising:
    a base material powder represented by one or more of $(Ca_{1-x}Sr_x)(Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$, in which x and y satisfy $0 \leq x \leq 1.0$ and $0.2 \leq y \leq 0.9$, respectively;
    0.1 at % to 1.0 at % of a second accessory ingredient, an oxide or carbonate containing at least one of magnesium (Mg) and aluminum (Al), based on 100 at % of the base material powder;
    a third accessory ingredient, an oxide or carbonate containing at least one of cerium (Ce), niobium (Nb), lanthanum (La), and antimony (Sb); and
    a fourth accessory ingredient, different from the second accessory ingredient, an oxide or carbonate containing at least one of silicon (Si), barium (Ba), calcium (Ca), and aluminum (Al), or a glass compound containing silicon (Si).

2. The ceramic dielectric composition of claim 1, wherein x and y have different values.

3. The ceramic dielectric composition of claim 1, further comprising 0.1 at % to 1.0 at % of a first accessory ingredient, an oxide or carbonate containing at least one of manganese (Mn), vanadium (V), chromium (Cr), Iron (Fe), nickel (Ni), cobalt (Co), copper (Cu), and zinc (Zn), based on 100 at % of the base material powder.

4. The ceramic dielectric composition of claim 1, wherein room-temperature permittivity of a ceramic body formed of the ceramic dielectric composition is 50 or more.

\* \* \* \* \*